United States Patent [19]

Lomax et al.

[11] Patent Number: 5,261,482

[45] Date of Patent: Nov. 16, 1993

[54] COOLING APPARATUS AND COUPLINGS THEREFOR

[75] Inventors: Curtis Lomax, Santa Clara; Bruce Webbon, Woodside, both of Calif.

[73] Assignee: The United States of America as represented by the Administrator of National Aeronautics and Space Administration, Washington, D.C.

[21] Appl. No.: 703,649

[22] Filed: May 21, 1991

[51] Int. Cl.$^5$ .............................................. F28D 20/00
[52] U.S. Cl. ................... 165/10; 165/104.17; 165/78; 62/59; 62/259.3; 62/299
[58] Field of Search ............ 165/10, 104.17, 78; 62/59, 430, 460, 259.3, 299

[56] References Cited

U.S. PATENT DOCUMENTS

| | | | |
|---|---|---|---|
| 2,111,905 | 3/1938 | Smith, Jr. et al. | 62/460 |
| 2,518,299 | 8/1950 | Fernandez | 62/299 |
| 3,316,732 | 5/1967 | Burton | 62/259.3 |
| 4,095,593 | 6/1978 | Webbon et al. | 62/259.3 |
| 4,702,306 | 10/1987 | Hevzog | 165/35 |
| 5,092,129 | 3/1992 | Bayes et al. | 62/259.3 |

Primary Examiner—Albert W. Davis, Jr.
Attorney, Agent, or Firm—Darrell G. Brekke; Guy Miller; John R. Manning

[57] ABSTRACT

A cooling apparatus includes a container filled with a quantity of coolant fluid initially cooled to a solid phase, a cooling loop disposed between a heat load and the container. A pump for circulating a quantity of the same type of coolant fluid in a liquid phase through the cooling loop, a pair of couplings for communicating the liquid phase coolant fluid into the container in a direct interface with the solid phase coolant fluid.

12 Claims, 6 Drawing Sheets

COOLING APPARATUS AND COUPLINGS THEREFOR

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

1. Technical Field of Field of Invention

The present invention relates generally to the field of heat transfer and, more specifically, to a direct-interface, fusible heat sink for non-venting, regenerable and self-contained thermal regulation.

2. Description of the Prior Art

Astronaut cooling during extravehicular activity (EVA) is a critical design issue in developing a portable life support system that meets the requirements of a space station mission. Some of the requirements are that the cooling device be easily regenerable and non-venting during operation.

During EVA, a crew member generates metabolic energy, while portable life support systems and equipment produce additional heat. Ninety percent of metabolic energy is in the form of waste heat that must be removed from the body during the EVA to allow crew comfort and performance. Once removed from the body the heat may be either stored or rejected, or both.

On orbit, heat rejection occurs only by radiation or mass transfer. Heat storage may be accomplished by inducing a phase change in a substance or by causing an endothermic reaction to take place. Any self-contained system that attempts to control the thermal condition of an astronaut wearing a space suit will be limited by either capacity or rate of heat transfer. For example, a storage system will be limited by capacity, as will a mass transfer system. A radiation system will be limited by heat-transfer rate.

Thermal regulation of astronauts during EVA has been accomplished in the past by use of a sublimator or an umbilical coolant supply. These systems provide adequate capacity and rate and are compact and light weight. However, they have disadvantages in that they require venting and subsequent loss of water during operation. Also, the urabilicals are awkward and difficult to manage.

Future exploration missions will require an EVA system that can provide routine, possibly daily, operation that continues for months without support or re-supply from surface-based resources or facilities. For these reasons, it is desirable for a thermal regulation system to be easily regenerable, non-venting, and extremely reliable. Some specific requirements are that the total capacity be about 11,680 Btu (3,420 W-hr) for an 8 hr EVA and that the device be able to cool at 2,000 Btu/hr (585.6 W) for 15 minutes any time during this 8 hr period. More specific requirements are listed below in Table 1:

TABLE 1

| Design and Performance Requirements | |
|---|---|
| EVA duration | 8 hr |
| EVA environment | LEO (any orientation) |
| Environment load | 0 Btu/hr (0 W) |
| Metabolic heat load | |

TABLE 1-continued

| Design and Performance Requirements | |
|---|---|
| Minimum | 400 Btu/hr (117 W) |
| Average | 1000 Btu/hr (293 W) |
| Maximum | 2000 Btu/hr (5686 W) |
| PLSS heat load | Average, 635 Btu/hr (186 W) |
| Net Heat Load | |
| Minimum | 635 Btu/hr (186 W) |
| 8-hr average | 1500 Btu/hr (439 W) |
| 15-min max | 2000 Btu/hr (586 W) |
| Total heat capacity | 11680 Btu (3420 W) |
| Cooling garment temperatures | |
| Minimum | 60° F. (15.5° C.) (5) |
| Maximum | 85° F. (29.4° C.) |
| Heat-sink outlet temperature | <40° F. (4.4° C.) (humidity control) |
| Regeneration time | Less than 16 hr |
| EVA frequency | 8 hr/day, 6 day/Wk |
| Mission duration | 6 mo |
| Operational lifetime | >1228 hr |

While there has been a number of astronaut cooling devices that use fusible heat sinks, none has demonstrated a direct interface between the cooling liquid transport loop and the phase-change material. Moreover, all the previous designs have incorporated conventional heat exchangers.

SUMMARY OF THE INVENTION

An object of the present invention is to provide a cooling apparatus having a direct interface between the cooling fluid transport loop and the phase-change material.

Another object of the present invention is to provide a cooling apparatus which eliminates the use of a heat exchanger and allows direct-contact, forced-convection heat transfer between the cooling fluid loop and the phase change material.

Yet another object of the present invention is to provide a cooling apparatus having a reduced weight, thermal resistance, and system complexity.

These and other objects of the invention are met by providing a cooling apparatus which includes a container filled with a quantity of coolant fluid initially cooled to a solid phase, a cooling loop disposed between a heat load and the container, means for circulating a quantity of the same type of coolant fluid in a liquid phase through the cooling loop, and coupling means for communicating the liquid phase coolant fluid into the container in a direct interface with the solid phase coolant fluid.

The coupling means include a pair of quick-disconnect couplings, each including a male and a freezable female portion and providing an interior and exterior flow path with respect to the container.

The present invention has advantages over known devices in that the phase change material remains sealed at all times, including during regeneration. Also, the present invention uses quick-disconnect couplings that allow the phase change material to completely fill the container, i.e., no air spaces or fluid pathways before "start-up", and is easily handled in micro-gravity without spills, leakage or handling of phase change material. The device does not need and does not use gravity to assist operations.

These and other features and advantages of the cooling apparatus according to the present invention will become more apparent with reference to the following detailed description and drawings.

DETAILED DESCRIPTION OF THE INVENTION

Figure 1A:
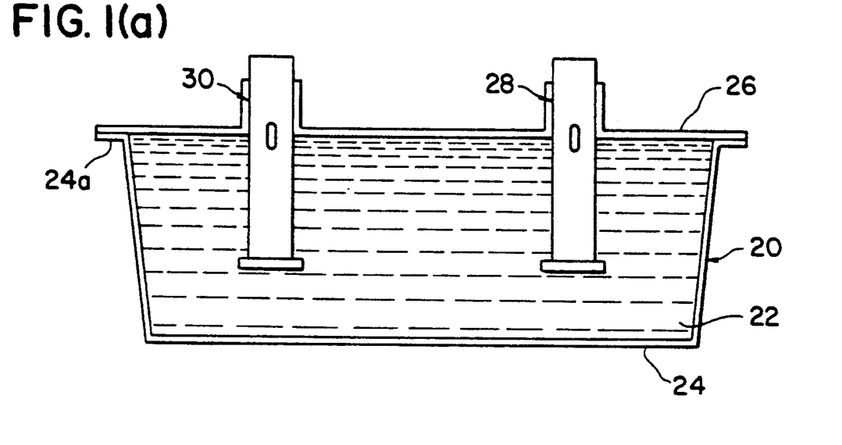
FIGS. 1(a)-1(c) are schematic, longitudinal sectional views showing a heat sink according to the present invention showing initial filling with water, regeneration to a frozen state, and liquid flow between first and second couplings, respectively.
Figure 1B:
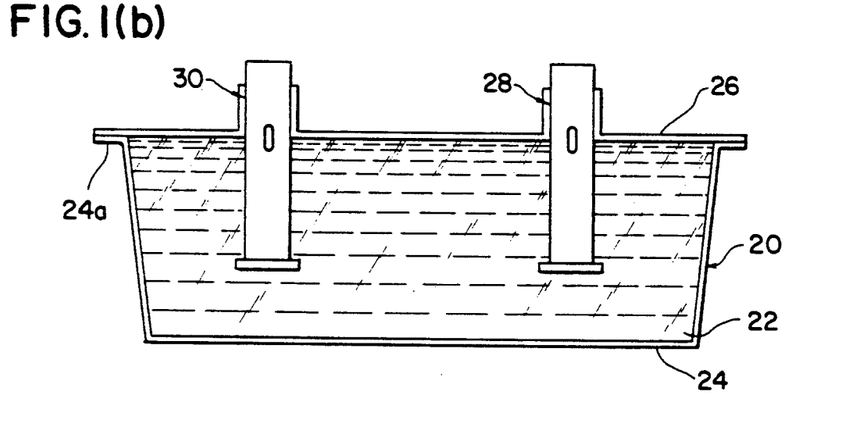
Figure 1C:
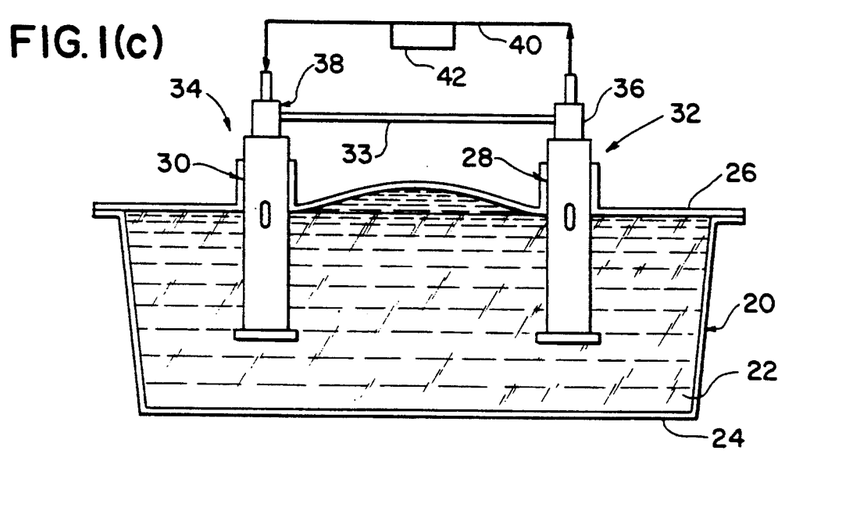

Referring now to FIGS. 1(a)-1(c), a first aspect of the present invention is illustrated as a container 20 which is filled with a quantity of coolant fluid 22. The coolant fluid is water and is thus in a liquid phase. The container 20 is an elastic bladder cast from a two-part polyurethane elastomer. The two-parts include a tank 24 and a cover 26, with the two-parts being held together at a peripheral flange 24a of the tank 24 by conventional means, such as clamps, threaded fasteners, etc. The cover 26 is penetrated by two female portions 28 and 30 of two couplings, each coupling including a female portion (28 or 30) and a corresponding male portion (to be described below).

The container 20 is filled with water until it is in slight tension, as shown in FIG. 1(a). Upon freezing, thus transferring the coolant fluid from a liquid phase to a solid phase, the container is stretched slightly due to the expansion of the ice. The solid phase of the coolant fluid is illustrated in FIG. 1(b).

When the first water (coolant fluid of the same type as in the container but in a liquid phase) from the cooling system is pumped into the container, as will be described in greater detail below, the flexible wall of the container is separated from the ice, thereby stretching the container even more. This condition is illustrated in FIG. 1(c). As the ice melts, the container relaxes and when the pump stops, at the end of the EVA, the container is again under slight tension. The container may be disconnected and re-frozen at this point and the process repeated.

The initial coolant flow path is created by the use of freezable quick-disconnect couplings 32 and 34. Coupling 32 includes the female portion 28 and a male portion 36, while the coupling 34 includes the female portion 30 and the male portion 38. The two couplings 32 and 34 are used to communicate the liquid phase coolant fluid into the container 20 in a direct interface with the solid phase coolant fluid contained therein. Moreover, the container 20 and frozen coolant fluid disposed therein constitute a heat sink which is disposed in a cooling loop 40 (shown schematically in FIG. 1(c), with the cooling loop 40 running between a heat load 42 and the heat sink.

The couplings 32 and 34 are identical, with each having a male and a female portion. The two female portions 28 and 30 are embedded in the elastic wall of the container and frozen with the coolant fluid. Freezing of the coolant fluid (water) in the container 20 occurs as a regeneration step in a separate freezer (not shown). After freezing, the male portions 36 and 38 are inserted into the respective female portions and flow is initiated. Conceivably, other coolant fluids may be employed, so long as they have solid-to-liquid phase transition temperature compatible with the intended use of the cooling apparatus.

Figure 2:
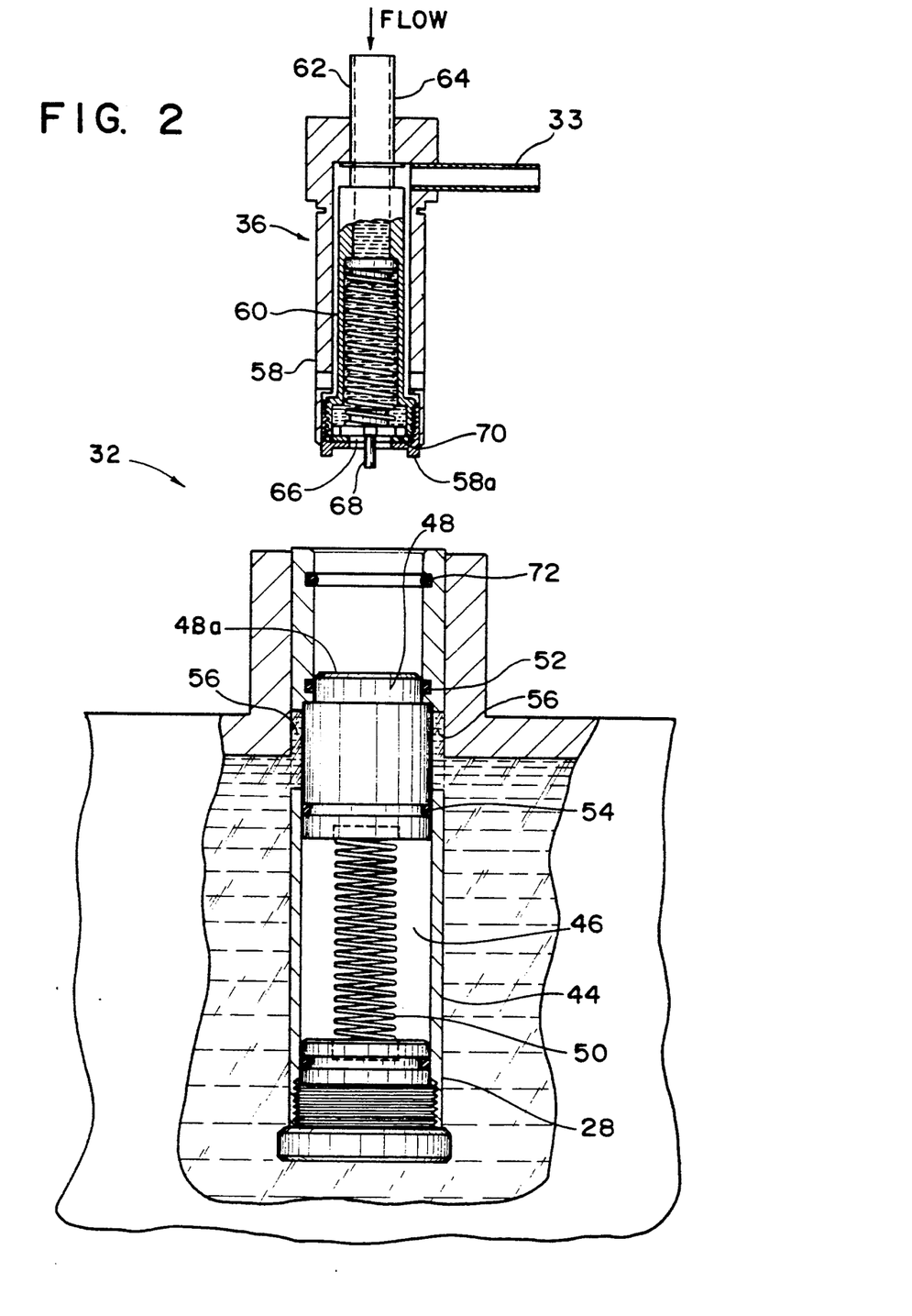
FIG. 2 is an enlarged, sectional view showing one of the couplings according to the present invention, prior to insertion of a male portion into a female portion.

Referring to FIG. 2, the coupling 32 is shown just prior to insertion of the male portion 36 into the female portion 28. The female portion 28 includes a housing 44 which defines a cavity 46 in which a piston 48 is slidably disposed. The piston is biased in an upward disposition by a spring 50 and a pair of O-rings 52 and 54 are used to seal the cavity as the piston slides therein.

An upper portion of the housing 44 is provided with at least one radial passage 56 (preferably two) which may, for example, take the form of two diametrically opposed openings in the cylindrical side wall of the housing 44. As can be seen in FIG. 2, ice forms in the radial passages 56 thus blocking the passages.

The coupling 32 acts as an inlet to the heat sink, while the coupling 34 acts as the outlet. The male portions 36 and 38 of the two couplings are interconnected via a line 33 so that, initially, an exterior flow path is generated from the first coupling 32 to the second coupling 34. Heated liquid from the heat load enters the coupling 32 through an upper end 64 of an inner tube 62. The male portion 36 also includes a housing 58 which defines an inner cavity 60. The end portion 64 extends through and protrudes beyond one end of the housing 58. This end portion 64 is coupled to conduit of the cooling loop 40 leading to the heat load 42 so that fluid entering male portion 36 has been heated by the load. The opposite end of the inner tube 62 has an opening 66 through which the heated coolant fluid (in a liquid phase) passes. However, before the liquid coolant can pass through the opening 66, a plunger 68, acting as a valve member normally seated over the opening 66 on a seal 70, is actuated by abutment with the female portion. Thus, in FIG. 2, a no-flow condition exists in the cooling system because liquid coolant in the inner tube 62 cannot escape.

Figure 3:
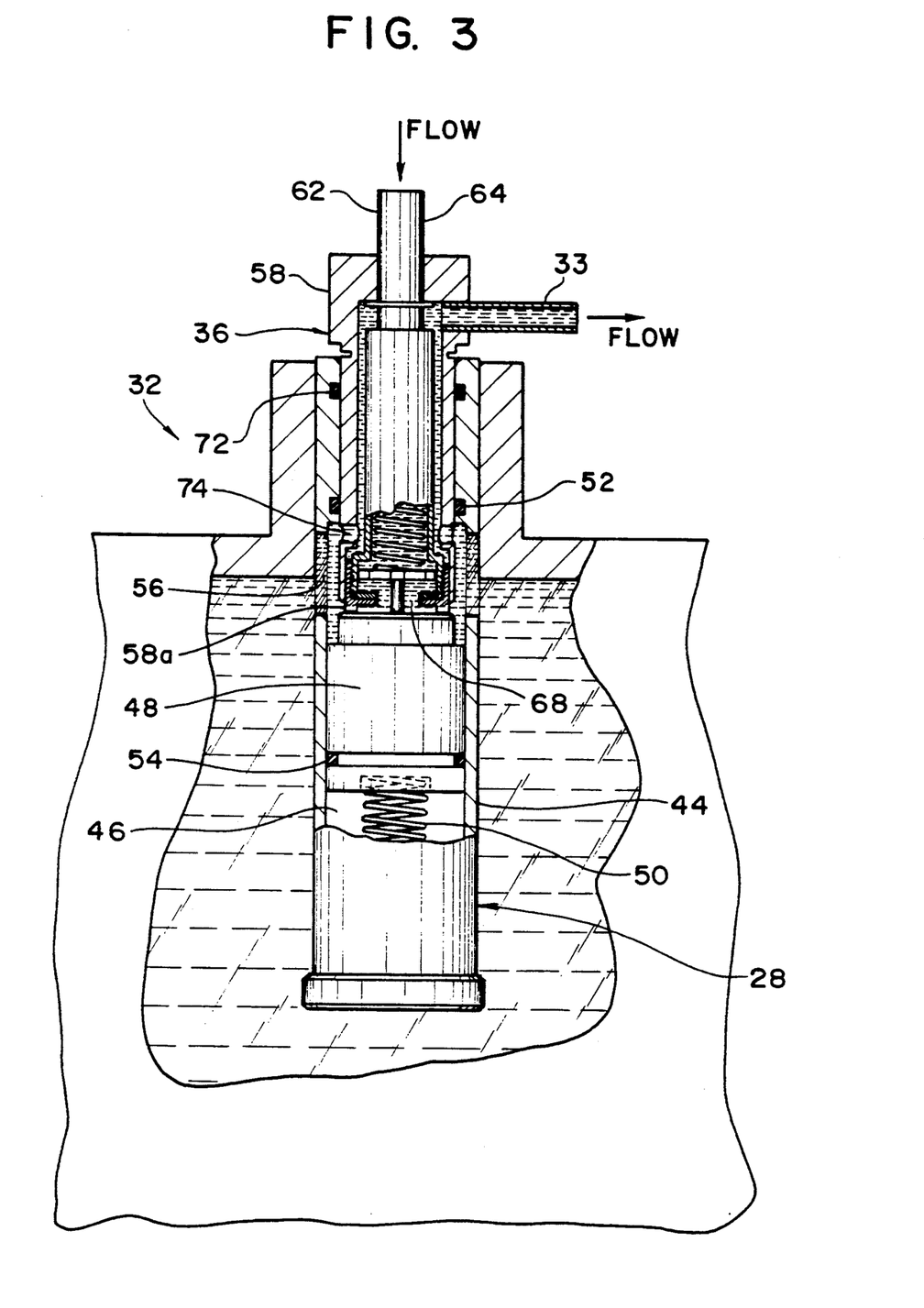
FIG. 3 is a cross-sectional view, similar to FIG. 2 showing the coupling, acting as an inlet, in a frozen condition whereby external flow is possible.

Referring now to FIG. 3, the male portion 36 is shown inserted into an operative position in the female portion 28. An O-ring 72 at the throat of the female portion sealingly engages the housing 58 of the male portion 36. The plunger 68 abuts an upper surface 48a of the piston 48 to thereby cause the plunger 68 to move upwardly within the inner tube 62. The bottom of the male housing 58 is spaced upwardly from the upper surface 48a of the piston 48 by means of a plurality of circumferentially spaced feet 58a of the housing 58. This allows water to flow through the inner tube 62 of the male portion 36 and into the empty cavity of the female portion 28. As shown in FIG. 3, the path of the water is blocked at the passages 56 by ice formed therein, so that the water then returns through radial passages 74 formed in the cylindrical side wall of the male portion housing 58. The water then flows in the annular space defined between the outer surface of the inner tube 62 and the inner surface of the housing 58, and then through the external line 33 to the second coupling 34. Flow through the second coupling is the reverse of that illustrated in FIG. 3, whereby the end portion 64 of the inner tube 62 would provide a flow outlet (directional arrows reversed) to pass cooled liquid coolant to the heat load. Liquid coolant would enter the male coupling 34 through the line 33 and flow down through the annular space and out the radial passage 74, then upwardly through the inner tube 62 and out the end portion 64. In FIG. 3, the female portion 28 of the first coupling 32 is frozen with the coolant fluid, so that the passages 56 are blocked by ice. In this condition, only external flow is possible, meaning that flow from the first coupling 32 to the second coupling 34 is through the line 33. Even in this frozen condition, however, an interface between the solid phase coolant in the container and liquid phase coolant pumped from the heat load occurs at the passages 56, thereby effecting heat transfer at the interface.

Figure 4:
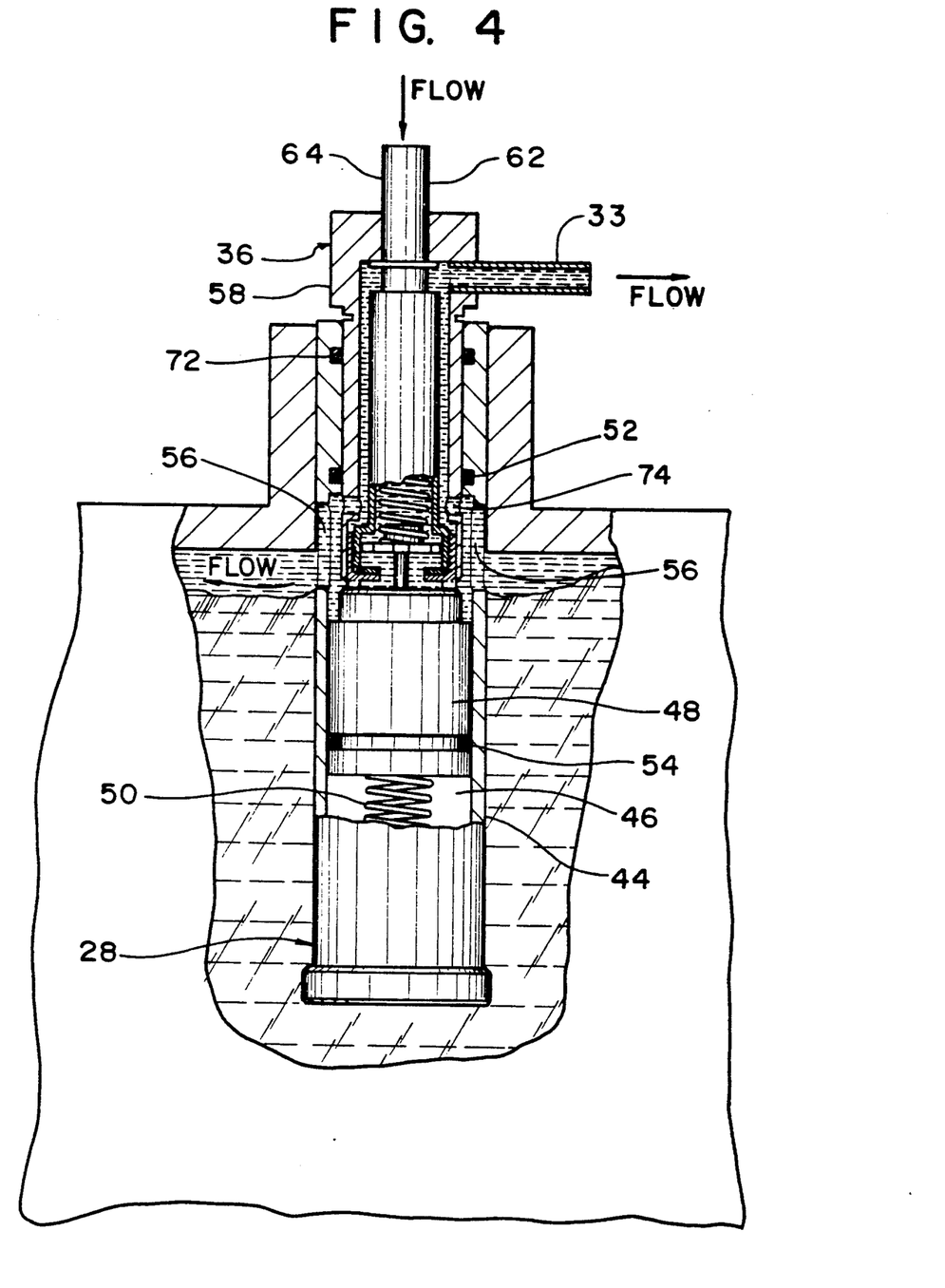
FIG. 4 is a cross-sectional view of the coupling in an initial flow condition whereby internal flow is possible.

Referring to FIG. 4, internal flow is made possible by the liquid phase coolant fluid essentially melting away the ice in the passages 56 and thus expanding the interface between the frozen, solid phase coolant fluid and the liquid phase coolant fluid. In other words, once the ice in the passages 56 has melted and flow is established between the passages 56 of the coupling 32 and the passages 56 of the coupling 34 (the two couplings being identical), the external line 33 is no longer part of the cooling loop and all flow passes internally of the container 20, and an interface is established between the surface of the ice in the elastic container and the liquid coolant passing from the inlet coupling 32 to the outlet coupling 34. For completion of the cooling loop, flow through the second coupling 34 is the reverse of that through the coupling 32, so that liquid phase coolant fluid passing within the container 20 from the coupling 32 enters the passages 56 of the coupling 34 and, after melting through the ice originally disposed therein, then passes through the interior of the inner tube 62 and out the upper end portion 64, returning cooled coolant fluid to the heat load.

Circulation through the cooling loop is effected, for example, by means of a pump 88 (shown in FIG. 5), and the heat load may be in the form of a liquid-cooled ventilation garment (LCVG) worn by astronauts. LCVG's are generally known.

Figure 5:
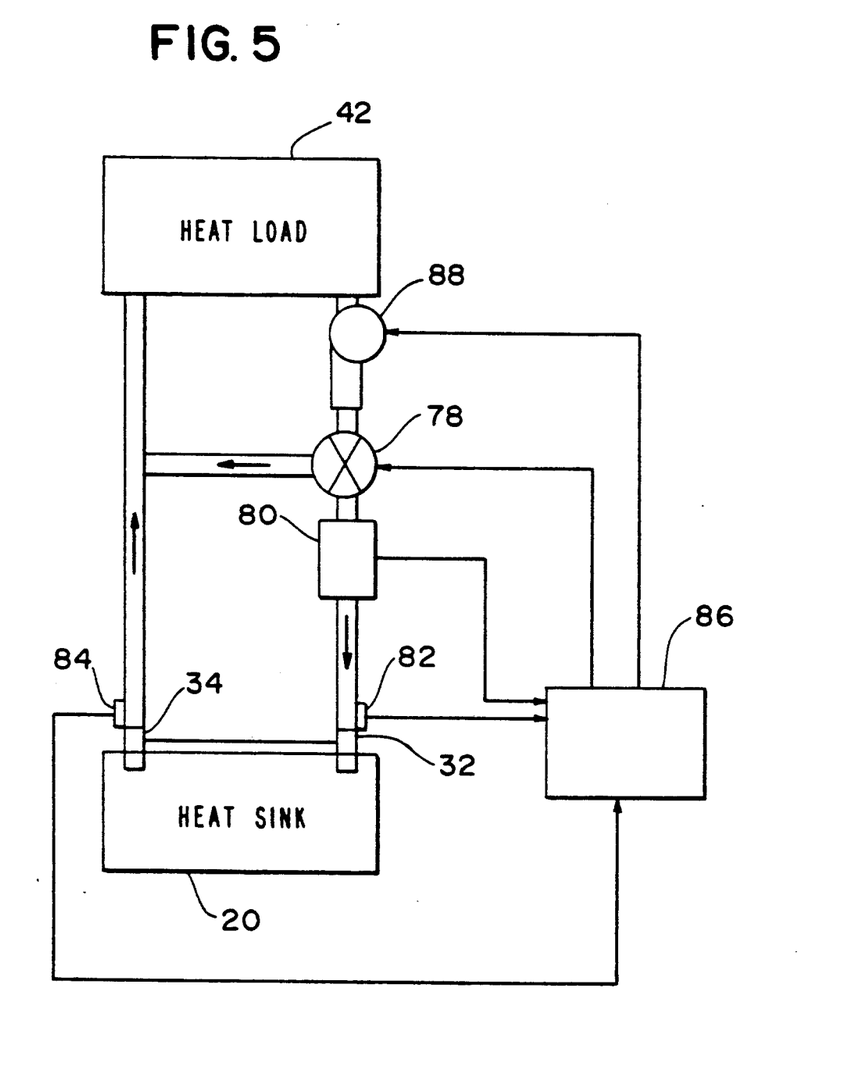
FIG. 5 is a schematic view of a cooling system employing the cooling apparatus according to the present invention.

The metabolic heat load will vary during the entire EVA, as will the potential heat-sink transfer rate. The latter is due to the changing surface area of the ice that the warm water encounters during the melt. The sink heat-transfer rate is controlled by adjusting the mass flow rate through the heat sink by a diverter valve 78, as shown in FIG. 5. The diverter valve 78 controls flow rate during low metabolic heat load conditions so that only a small percentage of the 240 lb/hr (108.7 kg/hr) mass flow is diverted through the heat sink. On the other hand, during high metabolic heat load, a larger percentage is diverted by adjusting the position of the valve 78. If, for example, a constant metabolic heat load is assumed throughout the melt, the mass flow rate through the heat sink must gradually increase as the melt progresses in order to maintain the heat-transfer rate. Thus, the present invention provides for adequate mixing to occur during the later stages of the melt in order to maintain proper heat-transfer rates and to fully utilize the phase change material. Mixing can occur by any suitable means. Proper heat transfer rates are maintained by forced convection.

It is expected that heat transfer rates will be hindered in a microgravity condition, as experienced during EVAs, due to a reduction in buoyant forces. Generally, an increase in turbulence of flow (i.e., mixing) from the inlet into the container will enhance the heat transfer rate. For example, the quick disconnect couplings can be adjusted to increase the velocity at the inlet and thus provide a jetting action that would increase turbulence of flow in the container. This can be expected to increase the heat transfer rate.

A monitoring system incorporated into the present invention is illustrated in FIG. 5, whereby a flow meter 80 monitors flow rate to the inlet coupling 32, while at the same time, thermocouples 82 and 84 monitor inlet and outlet temperature. A controller 86 receives input signals from the thermocouples 82 and 84 and the flow meter 80, and outputs control signals based on a stored program to the valve 78 and the pump 88.

Figure 6:
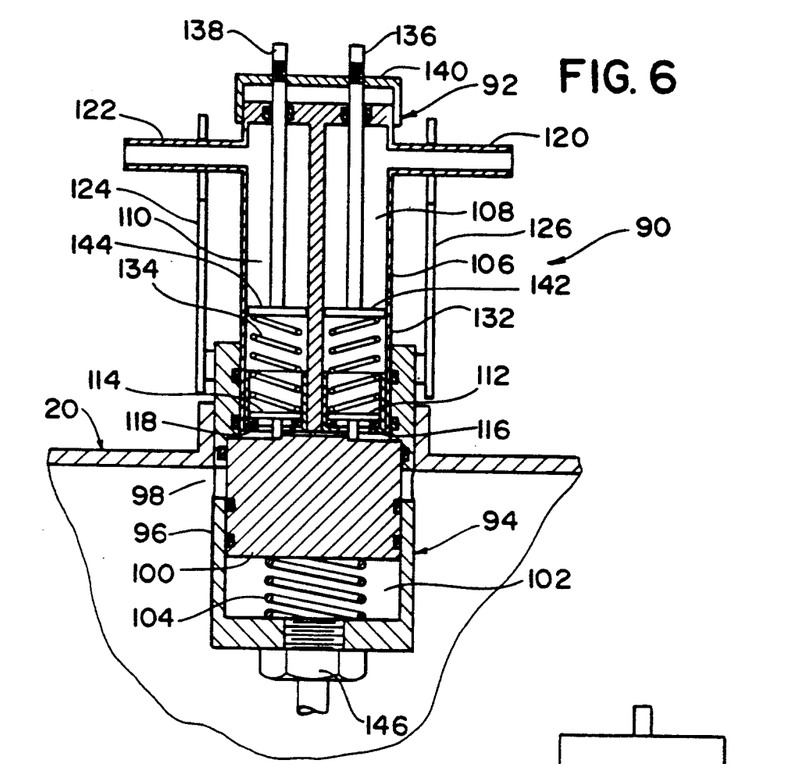
FIG. 6 is a cross-sectional view of another embodiment of a coupling according to the present invention.
Figure 7:
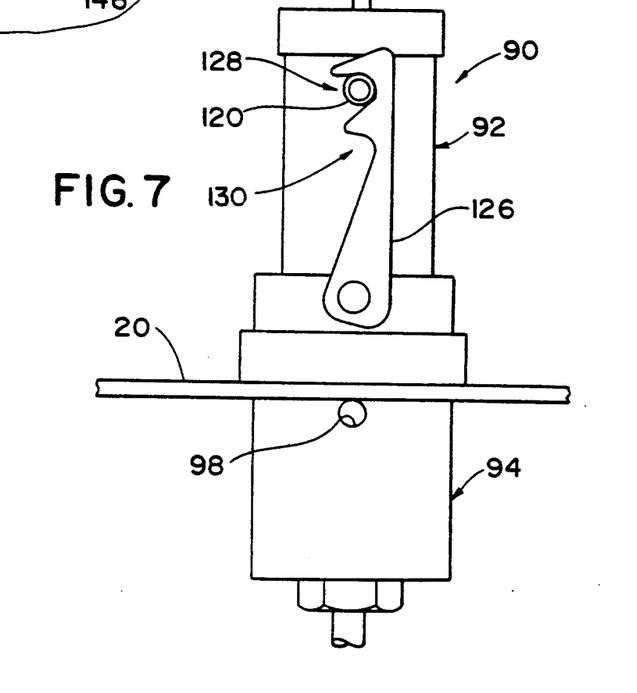
FIG. 7 is a side elevational view of the coupling of FIG. 6.

Referring now to FIGS. 6 and 7, a second embodiment of the coupling according to the present invention is illustrated. The coupling 90 is similar to the coupling 32 (which is identical to the coupling 34) in that the coupling includes a male portion 92 and a female portion 94. The female portion includes a housing 96 provided with passages 98 which are filled with ice when the container 20 is filled and frozen. A piston 100 is movable in a chamber 102 and is spring biased upwardly by a spring 104. The piston 100 blocks the passages 98 when the coupling 90 is in the uncoupled mode.

The male portion 92 includes a two-part housing 106. The housing 106 includes two chambers 108 and 110, each having a plunger 112 and 114, respectively disposed at the inner open ends of the two chambers. With the plungers seated on seals 116 and 118, no fluid can flow from the male portion 92 to the female portion 94. Moreover, fluid cannot flow from one chamber to the other. A line 120 provides an inlet which is coupled to the cooling loop to provide warm fluid from the heat load to the container 20. Since the coupling 90 could be used in conjunction with a second, identical coupling in the same manner as couplings 32 and 34, the line 120 would provide an outlet for the second coupling.

When the male portion 92 is inserted into the female portion 94, the piston 100 is depressed downwardly, and the plungers 112 and 114 are un-seated by abutment against an upper surface of the piston 100. Also, when the male portion is inserted to an operative position, the upper surface of the piston moves downwardly to expose the passages 98, thus providing an interface between frozen coolant fluid located in the passages 98 and the liquid coolant which enters the space within the female housing 96 above the piston. Since the passages 98 are blocked, fluid will flow from the first chamber 108 and back out through the chamber 110, and then through the line 122 to the second coupling (which is identical to the coupling 90), whereby flow through the second coupling is identical to that of the first coupling.

After the ice in the passages 98 melts, a flow of liquid is generated internal of the container 20, thus by-passing the line 122 of the coupling 90.

A pair of locking arms 124 and 126 are pivotally connected to the female portion 94, and include a first notch 128 for holding the male portion 92 in the female portion 94 but not at an operative depth. This position is illustrated in FIGS. 6 and 7. A second notch 130 is provided in the arms 124 and 126 so that when the male portion 92 is further depressed into the female portion, the arms latch on to the lines 120 and 122 to thereby hold the male portion 92 in the female portion 94. This embodiment assumes that the lines 120 and 122 are somewhat rigid.

In the embodiment of FIGS. 6 and 7, adjustment means are provided for adjusting the spring force in the springs 104 of the female portion 94 and the springs 132 and 134 of the male portion. In particular, load adjusters 136 and 138 are provided in chambers 108 and 110, respectively, and the axial positions therein can be adjusted by rotating the load adjusters which have threaded ends engaging threaded bores of a cap 140. The load adjusters have end portions 142 and 144 which provide abutments for the springs 132 and 134 while at the same time permitting the passage of fluid thereby. This can be accomplished by forming the abutments with radially extending portions which permit fluid flow therebetween. Also, a spring load adjustment mechanism can be provided for the spring 104 by tightening or loosening a nut 146.

Numerous modifications and adaptations of the present invention will be apparent to those so skilled in the art and thus, it is intended by the following claims to cover all such modifications and adaptations which fall within the true spirit and scope of the invention.

We claim:

1. A cooling apparatus comprising:
   a container adapted to be filled with a quantity of coolant initially cooled to a solid phase;
   a cooling loop disposed between a heat load and the container;
   means for circulating a quantity of coolant in a liquid phase through the cooling loop; and
   means, at least partially disposed within the container, for detachably coupling the container to the cooling loop, and thereby communicating the liquid phase coolant into the container to form a direct interface with the solid phase coolant.

2. A cooling apparatus according to claim 1, wherein the container is made of a polyurethane elastomer and is adapted to be filled with coolant in liquid phase to be under slight tension prior to cooling the coolant to the solid phase.

3. A cooling apparatus according to claim 1, wherein the circulating means comprises a pump.

4. A cooling apparatus according to claim 1, wherein the coupling means comprises an inlet coupling and an outlet coupling, the inlet coupling receiving coolant in liquid phase from the heat load and the outlet coupling delivering coolant in liquid phase to the heat load.

5. A cooling apparatus according to claim 4, wherein both the inlet coupling and the outlet coupling include a male portion and a female portion, with the female portions passing through the container and being mounted therein.

6. A cooling apparatus according to claim 5, wherein the male portion includes a housing having an interior cavity, an inner tube disposed in the cavity, and a valve member disposed at one end of the inner tube and being spring biased into a seated position.

7. A cooling apparatus according to claim 6, wherein each female portion of the first and second couplings includes a housing defining an interior cavity in which a piston is slidable and spring biased into a closed position, the housing having at least one passage in a sidewall thereof, the at least one passage being blocked by the piston when the piston is in the closed position.

8. A cooling apparatus according to claim 7, wherein the at least one passage of the female portion housing is initially blocked by coolant in solid phase after regeneration of the coolant.

9. A cooling apparatus according to claim 8, wherein the male portion has an annular space between an outer surface of the inner tube and an inner surface of the male portion housing, and wherein the valve member of the male portion is a plunger which cooperates with an upper surface of the piston of the female portion to release coolant in liquid phase from the inner tube.

10. A cooling apparatus according to claim 9, wherein the first and second couplings are interconnected by an external line having opposite ends passing through the housings of the first and second couplings.

11. A cooling apparatus as set forth in claim 1 wherein
   a valve is disposed in the cooling loop for controlling the amount of liquid phase coolant delivered to the container from the heat load.

12. A cooling system according to claim 11, further comprising first and second thermocouples disposed respectively at inlets and outlets of the container and outputting a temperature signal to a controller, a flow meter outputting a signal indicative of flow volume to the controller, the controller outputting control signals to the circulating means and the valve in response to temperature and flow signals to thereby regulate heat transfer.

* * * * *